United States Patent Office 3,519,585
Patented July 7, 1970

3,519,585
PRESSURE SENSITIVE ADHESIVE
COMPOSITION
James A. Miller, Akron, Ohio, assignor to Morgan Adhesives Company, Stow, Ohio, a corporation of Ohio
No Drawing. Continuation-in-part of application Ser. No. 660,191, Aug. 14, 1967, which is a continuation-in-part of application Ser. No. 542,209, Apr. 13, 1966. This application Apr. 25, 1969, Ser. No. 819,486
Int. Cl. C08d 9/12; C09j 3/26
U.S. Cl. 260—27
10 Claims

ABSTRACT OF THE DISCLOSURE

A pressure sensitive adhesive made from two copolymers of the styrene-butadiene type, one having blocks of polystyrene at each end of the polymer molecule and one having a polystyrene block at one end of the polymer molecule. A tackifying resin, e.g., pentaerythritol ester of hydrogenated rosin, is included in the adhesive. Appropriate solvents, e.g., hydrocarbons, are used.

---

This application is a continuation-in-part of my application Ser. No. 660,191 which is a continuation-in-part of my application Ser. No. 542,209, filed Apr. 13, 1966, both now abandoned.

The present invention relates to adhesive compositions, and particularly to a pressure sensitive adhesive that is characterized by its high peel strength, creep resistance, and tack strength.

Heretofore there have been many different types of pressure sensitive adhesives provided, but it has been impossible to obtain a pressure sensitive adhesive that has extremely high creep resistance, as well as high tack and peel values or strengths.

It is the general object of the present invention to provide a novel pressure sensitive adhesive composition made from mixtures of two styrene-butadiene copolymers, one having blocks of polystyrene at each end of the polymer molecule and one having a polystyrene block at one end of the polymer molecule which mixture has a resin therein partially compatible with the copolymers and capable of producing "tack."

Further objects of the invention are to provide a novel and improved pressure sensitive adhesive made from mixtures of solution polymerized styrene-butadiene rubbery copolymers preferably made with not more than 50 parts styrene which have polystyrene blocks therein; to provide a pressure-sensitive adhesive made from a styrene-butadiene copolymer having terminal blocks of polystyrene at each end of the polymer molecule and from a styrene-butadiene copolymer having a polystyrene block at one end of the polymer molecule; to provide an adhesive with improved physical properties and wherein the filler materials present therein does not materially alter the physical properties of the final adhesive composition; and to provide a pressure sensitive adhesive wherein one or more resins may be mixed with the styrene-butadiene copolymers present in the adhesive and where the resins are partially soluble in regions of the copolymers, producing "tack."

Generally speaking, the present invention relates to the preparation of an improved pressure sensitive adhesive comprising a mixture of between 90 to 50 parts by weight of a styrene-butadiene rubbery copolymer having a polystyrene block at one end of the polymer molecule, between about 10 to 50 parts by weight of a styrene-butadiene rubbery copolymer having blocks of polystyrene at each end of the polymer molecule, and between 50 to 150 parts by weight of a resin per 100 parts of the copolymers and which resin is partially compatible with the styrene-butadiene copolymers and is capable of producing "tack" in the total mixture.

These styrene-butadiene copolymers have polystyrene blocks at one end or both ends of the polymer chain. These polystyrene blocks mutually attract each other to form "domains" of polystyrene in the adhesive. These "domains," at room temperature, appear to function as chemical crosslinks between the different polymer chains, preventing movement of these chains and thereby contributing to high cohesive strength of the final mixture. The copolymer having one terminal polystyrene block allows the added tackifying resin to tackify the mixture in the classical idea of styrene-butadiene tackification. The preferred adhesive mixture comprises about 30/70/85 parts by weight of di-terminal polymer, mono-terminal polymer, and resin components, respectively.

In making the novel and improved adhesives of the invention, it has been found that mixtures of certain percentages by weight of monoterminal polystyrene block copolymers with di-terminal polystyrene block copolymers (of styrene and butadiene) in combination with compatible tackifier materials, such as wood-derived resins and their derivatives, has provided an improved adhesive. Specifically, a commercial styrene-butadiene rubbery copolymer having blocks of polystyrene at each end of the polymer molecule (hence di-terminal blocks) containing 51.75% trans-1,4; 9.97% vinyl-1,2; and 38.2% cis-1,4 configuration by weight which has been found to be useful in the novel adhesive of this invention. Such a synthetic rubber or elastomer is a copolymer of styrene and butadiene which is made in accordance with the process disclosed in U.S. Pat. No. 3,321,635. The trade name for such elastomer is Kraton 101 and it is commercially available. The butadiene/styrene copolymer may contain about 5 to 15% vinyl, 30 to 60% cis and 30 to 60% trans configuration. The copolymer may be made from an isoprene/styrene copolymer as set forth in Pat. No. 3,231,635. The copolymer used in the present invention is, as described in the patent, made from an alkenyl aromatic hydrocarbon, preferably one or more monovinyl substituted aromatic hydrocarbons such as styrene, alpha methl styrene, vinyl toluene, vinyl xylene, vinyl naphthalene, etc. The materials with which a member of the foregoing group is block copolymerized is a conjugated diene hydrocarbon preferably having 4 to 8 carbon atoms per molecule and constitute one or more of the series butadiene, isopene, pentadiene-1,3, 2,3-dimethylbutadiene, and the like.

Attempts to make a pressure sensitive adhesive from the copolymer described above were unsuccessful because of the difficulty encountered in rendering the copolymer tacky. Another copolymer was added to permit tackification, that polymer being a styrene-butadiene rubbery copolymer having a polystyrene block on one end of the polymer molecule (hence mono-terminal block). Such a copolymer contains approximately 23.5 parts of styrene and 76.5 parts of butadiene and is available under the trade name of "Solprene 1205." Said copolymer contains about 57.1% trans - 1,4; 9.38% vinyl - 1,2; and 33.55% cis - 1,4 configuration by weight and is manufactured according to British Pat. No. 888,624. The process described in such British patent provides a block polymer which comprises a copolymer of (A) 1,3 - butadiene, isoprene or piperylene and (B) a vinyl-substituted aromatic hydrocarbon, and a homopolymer of a vinyl substituted aromatic hydrocarbon; such homopolymer preferably comprising a polystyrene block at one end of the molecule. It is believed that such copolymer permits tackification in the classical sense because of the random styrene which is present in the butadiene segment of the polymer chain. The polystyrene block at one end of the molecule is attracted into the polystyrene domains of the di-terminal block copolymer, resulting very little dilution of the cohesive strength of the final mixture.

Even though other starting materials than butadiene and styrene can be used to make either of the copolymers used in practice of the present invention, still the resultant copolymers are of the butadiene-styrene type or nature and the term butadiene-styrene copolymer as used in the specification and claims is used in a broad sense to cover materials obtained in accordance with the teachings in the above-identified patents.

In both of the copolymers used in practice of the invention, styrene preferably is not present in more than 50 parts by weight in relation to the 50 parts or more of weight of the copolymer as greater amounts of styrene make the copolymer too brittle and/or hard.

The di-terminal block copolymer is reinforced by the presence of polystyrene domains in it but it, however, usually cannat be tackified without sacrificing some of the cohesive strength, or creep resistance. The mono-terminal block copolymer does provide for tackification, and it is felt that the blocks of polystyrene in such mono-terminal block copolymer may be attracted to the polystyrene domain of the other copolymer, so that the reinforcement is not diluted.

The di-terminal block copolymer used by itself in an adhesive provides poor or low tack strength but it does have good creep or shear strength in an adhesive. Use of emulsion-polymerized styrene-butadiene rubbers, such as GRS-1011 in sufficient quantities to enable tackification appears to reduce the cohesive strength of the final mixture. However, it has been found that a material such as the copolymer containing the mono-terminal polystyrene block will blend with or be attracted to the polystyrene end blocks of the di-terminal polystyrene block copolymer, thereby imparting the ability to tackify the blend with resins, at no loss of creep resistance or shear strength. A reenforcing action is obtained by the one copolymer with the other similar to the action obtained by reenforcing fillers in bonding molecules of the two copolymers together.

The copolymers used in the novel adhesives have definite melting points and it is believed that the polystyrene domains or blocks melt first in the copolymer molecules, as each has such domains therein that are believed to provide a bonding action between the two copolymers.

In preparing the pressure sensitive adhesive of the invention, it has been found that the presence of tackifying materials, such as resins, that are compatible or at least partially compatible with both of the copolymers used in the adhesive, add materially to the desired properties of the resultant adhesive. These resins are believed to be soluble with the mono-terminal and di-terminal block copolymers because of the amorphous properties of both copolymers. Straight chain hydrocarbon resins are effective in the adhesive. Certain rosin acid derivatives may also be used as the tackifying materials and polar type resins are believed to be better in the practice of the invention although some essential non-polar resins may also be used. It is possible to add other resins to get the desired properties in the adhesive, particularly in the tack thereof, if the first resin used does not work satisfactorily by itself. In general, any of the common tackifiers for styrene-butadiene rubbery copolymers are believed to be suitable for practice of the invention.

The adhesives of the invention may be prepared by mixing the components thereof together and dissolving them in conventional amounts of a suitable solvent such as toluene, cyclohexane, ethylene dichloride, 1,1,2,2-tetrachlorethane, bromobenzene, diethylether, hexane, toluene and methyl ethyl ketone after which the adhesive can be deposited in a desired manner upon a suitable carrier medium or sheet and then be dried or otherwise have the solvent removed therefrom. The copolymer portions of the adhesive usually are mixed together in the solvent and thereafter the tackifying materials are added to yield a satisfactory adhesive. If desired, two or more resins may be present in the composition. Such resins should not be of the type that affect the polystyrene domains of the copolymer molecules in any way.

It will be realized that any desired quantities of any other suitable compounding ingredients may be present in the adhesive, such as anti-oxidants, antiozonants, ultraviolet light absorbers, plasticizers and fillers may be added as desired in accordance with conventional compounding practices in the adhesive industry today.

One specific example of a preferred composition for the adhesive of the invention is as follows:

Parts by weight
Mono-terminal block copolymer _____ 70
Di-terminal block copolymer _____ 30
Pentaerythritol ester of hydrogenated rosin _____ 85

Plus appropriate solvents, as desired, such as aliphatic hydrocarbons (hexane) or aromatic hydrocarbons (toluene) or blends thereof.

In the formula, the percentage by weight of the ingredients present may be varied between the following ranges and still attain a satisfactory adhesive:

Parts by weight
Mono-terminal block copolymer _____ 90–50
Di-terminal block copolymer _____ 10–50
Pentaerythritol ester of hydrogenated rosin ____ 50–150

In the specific example for the adhesive given hereinabove, it also may include, for example, any or all of the following ingredients, as indicated:

| Function | Type | Trade name | Range, phr.[1] | Specific example |
|---|---|---|---|---|
| Antioxidant | Hindered Phenol or Quinoline-based. | Antioxidant 2246, Flectol H. | .5–2.5 | 1 phr. |
| UV Absorber | Substituted benzophenone. | UV 531 | 1–4 | 2 phr. |
| Plasticizer | Monomeric ester or Polyester. | | 1–25 | Only for special applns. |
| Filler | Georgia kaolin or refined silica. | Syloid 244 | 0–100 | Do. |

[1] Parts per hundred of rubbery hydrocarbon.

Anti-oxidant 2246 is 2,2' methylenebis (4-methyl-6-tert-butyphenol). Flectol H is polymerized 1,2-dihydro-2,2,4-trimethylquinoline. The substituted benzophenone light absorber is 2-hydroxy 4-n-octoxybenzophenone. Syloid 244 is a highly porous pure silica gel of extremely low density. A typical monomeric plasticizer is butyl benzyl phthalate, while a polyester plasticizer is the reaction produce of a dibasic acid with a dihydric alcohol. These particular materials listed are typical conventional substances which may be used in these adhesives of the invention. Hence, the specific example given will typically contain about one part antioxidant and sometimes about two parts ultraviolet light absorber but such ultraviolet light absorber can be omitted and a good adhesive be obtained if an efficient antioxidant is used. For special purpose adhesives, plasticizers or fillers may be included in the adhesive. For maximum creep resistance strength, plasticizer should not be used in the higher range of the limits stated, while for maximum tack, the higher weights of filler should not be used. For maximum tack, not more than about 60 phr. of filler should be used and for maximum creep strength, not over about 15 phr. of plasticizer should be used.

Then pentaerythritol ester of hydrogenated rosin used is called Pentalyn H and such ester has been stabilized by hydrogenation. Such resin is hard and resistant to oxidation. It has a softening point of 102 to 110° C., an acid number of 7 to 16, and a specific gravity of 1.07 at 25/25° C. Other resins that have proven satisfactory in the percentages by weight as indicated hereinabove include any one or more of the following, all of which have the feature or property of being at least partially soluble in the copolymers without essentially affecting the polystyrene domains of the molecules, and these resins may be used singly or combined in the proportions indicated. The resins are:

Type—Identification or name
    Polyterpene—Gammaprene A–100
    Rosin acid—Galex NXD
    Glycerine ester of polymerized rosin—Polypale Ester 10
    Phthalate ester of hydroabietyl alcohol—Cellolyn 21
    Pentaerythritol ester of hydrogenated rosin—Pentalyn H
    Dehydrogenated rosin
    Polyterpene resins
    Glycerol esters of hydrogenated rosin
    Hydrogenated rosin
    Maleic anhydride-modified rosin and rosin derivatives
    Esters of hydroabietyl alcohol The tackifying resins used are wood distillation products where the distillate is subjected to further processing in known manners to obtain the specific products named. The polyterpene listed above is a pure beta pinene polymer with a softening point of 100° C. Such resin is completely neutral and s chemically inert. The polyterpene has a specific gravity of 0.98 and a .4 maximum acid number and saponification number. It is oxidation resistant and has wide solubility. The rosin acid example is a stable non-oxidizing rosin consisting principally of dehydroabietic acid. The glycerine ester of polymerized rosin has a softening point of 109 to 119° C., an acid number of 8 max. and a specific gravity of 1.08 at 25/25° C. The phthalate ester listed is made from technical hydroabietyl alcohol. Such resin is tacky and pale in color and soluble in a variety of low cost solvents. It has a softening point of 60 to 70° C., a specific gravity of 1.05 at 25/25° C., a saponification number of 129 and an acid number of 10 max.

In order to determine what is the best ratio of the two rubbers of elastomers used in the adhesive of the invention, certain tests were made with the percentage of tackifier material present being held constant at 70 parts per 100 parts of total rubber, or elastomer. These tests are as follows:

TABLE I

| Examples | A | B | C | D | E | F |
|---|---|---|---|---|---|---|
| Ratio mono-terminal block copolymer | 90 | 80 | 70 | 65 | 60 | 50 |
| To Di-terminal block copolymer | 10 | 20 | 30 | 35 | 40 | 50 |
| 30 min. room temperature peel (lbs. per inch) | ¹4.5 | ¹6.9 | ²6.4 | 4.9 | 4.7 | 4.4 |
| 16 hr. residence peel (lbs. per inch) | ¹4.3 | ¹6.7 | ³6.1 | 5.0 | 4.4 | 4.6 |
| Tack (lbs. per inch) | 6.5 | 4.3 | 4.3 | 4.0 | 3.8 | 3.7 |

¹ 100% coh.
² 25% coh.
³ 15% coh.

Tackifier—70 parts pentaerythritol ester or hydrogenated rosin for all tests; approximately 2 parts anti-oxidant present in test specimens.

The foregoing tests indicate that the best adhesive properties are obtained when the adhesive fails cohesively. The limit of 100% cohesive failure seems to fall between 20 to 30 parts di-terminal block copolymer concentration.

Yet another test of the adhesive of the invention was made to aid in determining the preferred amount of tackifier to be used. Hence, the following tests were made and the preferred amount of pentaerythritol ester of hydrogenated rosin per 100 parts of elastomer appears to be in the 75 to 100 parts range with better aging characteristics being found in the adhesive at the lower area of resin content. The adhesive for this test was selected to be one where it would fail adhesively before it would fail cohesively. Tests of varied concentrations of the resin in relation to a constant ratio of the two elastomers showed as follows:

TABLE II

| Examples | A | B | C | D | E | F | G | H | I | J | K |
|---|---|---|---|---|---|---|---|---|---|---|---|
| Ratio mono-terminal block copolymer | 65 | 65 | 65 | 65 | 65 | 65 | 65 | 65 | 65 | 65 | 65 |
| To di-terminal block copolymer | 35 | 35 | 35 | 35 | 35 | 35 | 35 | 35 | 35 | 35 | 25 |
| Pentaerythritol ester of hydrogenated rosin (phr.) | 50 | 55 | 60 | 65 | 70 | 75 | 80 | 85 | 90 | 95 | 100 |
| 30 min. room temp. peel (lbs. per inch) | 4.6 | 4.3 | 4.5 | 4.6 | 4.2 | 4.3 | 4.3 | 4.4 | 4.6 | 4.5 | 4.8 |
| Overnight room temp. peel (lbs. per inch) | 4.4 | 4.9 | 5.1 | 4.3 | 4.8 | 4.9 | 5.1 | 5.1 | 5.0 | 5.4 |
| Tack (lbs. per inch) | 4.5 | 3.2 | 3.8 | 3.9 | 2.5 | 2.3 | 2.4 | 2.6 | 3.6 | 3.5 | 4.0 |
| Coating weight | 2.02 | 2.10 | 2.01 | 2.15 | 2.04 | 2.12 | 2.00 | 2.04 | 2.16 | 2.16 | 2.13 |

Approximately 2 parts by weight anti-oxidant per 100 parts elastomer present in test specimens.

The tests set forth hereinabove are substantially standard in the industry and were all run under comparable conditions to provide uniform tests for comparison purposes. The cohesive failure in the peel tests was visually estimated.

While exact tests and formulae are set forth hereinabove, the quantities of materials used in the adhesive may be varied dependent upon the properties desired in the end adhesive. The specific quantities of different ingredients in the adhesive may normally be varied by several percent in most instances without materially effecting the adhesive.

The new adhesive of the invention is believed to be particularly outstanding in the high creep resistance strength thereof combined with its other good properties of tackiness and peel strength.

The improved properties of the adhesive of the invention compared to a standard, state-of-the-art pressure sensitive adhesive are shown in the following table:

TABLE III

|  | GRS 1011 (emulsion polymerized styrene-butadiene copolymer), 100 parts; tackifier (pentaerythritol ester of hydrogenated rosin), 70 parts | Typical adhesive of invention as per specific example hereinbefore |
|---|---|---|
|  | A | B |
| Coating Weight (gms./100 in.²) | 2.0 | 2.18 |
| 30 min. room temp. peel (#/in.) | 4.1 | 5.8 |
| Overnight room temp. peel (#/in.) | 4.1 | 7.1 |
| Tack (#/in.) | 4.7 | 6.4 |
| Creep (2# dead load shear, 90° F. hours to fail) | 40 | Infinite |
| Creep (room temp. 10# dead load shear) | ¹ 9 | ² 842 |

¹ Min.  ² Hours.

The copolymers described have been very effective in practice of the invention. Other solution polymerized styrene-butadiene copolymers having similar physical characteristics i.e. polystyrene blocks therein which attract each other or polystyrene blocks in other molecules or copolymers to form polystyrene "domains," but made with from about 5 to 50 parts by weight of styrene and with from about 90 to 50 parts by weight of butadiene may also be used in making the new adhesive.

The adhesive of the invention can be prepared by conventional procedures and the only commercially available, presently known products, and the characteristics thereof, suitable for use in the adhesive are identified. A new and useful adhesive with outstanding properties has been provided so that the objects of the invention have been achieved.

It should be noted that the formulas set forth herein show the primary components of the adhesive, or the substances essential to the adhesive. Hence, the adhesive consists primarily of the substances named but conventional amounts of anti-oxidnts, fillers, etc., may be present without detracting materially from the desirable characteristics of the adhesive.

While several complete embodiments of the invention have been disclosed herein, it will be appreciated that modification of these particular embodiments of the invention may be restored to without departing from the scope of the invention.

What is claimed is:

1. An improved pressure-sensitive adhesive having high peel and tack strength, high creep resistance and good shelf life which is characterized by being formed from a mixture having no oil therein and consisting essentially of:
   from about 90 to 50 parts by weight of a styrene-butadiene rubbery copolymer having polystyrene blocks at only one end of the copolymer molecule,
   from about 10 to 50 parts by weight of a styrene-butadiene rubbery copolymer having polystyrene blocks at each end of the copolymer molecule, the amount of the copolymers present being varied inversely and totaling 100 parts by weight,
   from about 50 to 95 parts by weight of a tackifying resin which is compatible with said copolymers, said resin being partially soluble in said copolymers and being a wood distillation, and
   about ½ to 2½ parts of an antioxidant.

2. An adhesive as in claim 1 where said mono-terminal polystyrene block copolymer is present in about 70 parts by weight and said di-terminal polystyrene block copolymer is inversely and correspondingly varied to be present in about 30 parts by weight.

3. An adhesive as in claim 1 where the total amount of resin material present is about 85 parts by weight per 100 parts of copolymers.

4. An adhesive as in claim 1 where the total amount of resin material present varies between 50 to 150 parts per 100 parts of copolymers.

5. An adhesive as in claim 1 where the mono-terminal block styrene-butadiene copolymer contains about 57% trans-1,4; about 10% vinyl-1,2 and about 35% cis-1,4 linkages, and wherein the di-terminal block styrene-butadiene copolymer contains about 52% trans-1,4; about 10% vinyl-1,2 and about 38% cis-1,4 linkages.

6. An adhesive as in claim 1 wherein the resin material is the pentaerythritol ester of hydrogenated rosin.

7. An adhesive as in claim 1 where said first-named copolymer contains a polystyrene block at one end of the polymer chain and the second-named copolymer has polystyrene blocks at each end of the polymer chain, said polystyrene blocks forming domains of mutual attraction.

8. An adhesive as in claim 1 where said copolymers result from the solution polymerization of mixtures of from about 5 to 50 parts of styrene and about 95 to 50 parts of butadiene in the presence of suitable catalysts.

9. A pressure sensitive adhesive tape comprising a backing sheet and a coating on at least one side of the adhesive of claim 1.

10. An improved pressure-sensitive adhesive having high peel and tack strength, high creep resistance and good shelf life which is characterized by being formed from a mixture that is free of oils and comprises.
   from about 90 to 50 parts by weight of a styrene-butadiene rubbery copolymer having polystyrene blocks at only one end of the copolymer molecule,
   from about 10 to 50 parts by weight of a styrene-butadiene rubbery copolymer having polystyrene blocks at each end of the copolymer molecule and being relatively easy to tackify, the amount of the copolymers present being varied inversely and totaling 100 parts by weight, and said copolymers comprising no more than 50% by weight of styrene, and
   from about 50 to 150 parts by weight of a tackifying wood distillation product resin which is compatible with said copolymers.

References Cited

UNITED STATES PATENTS

| 3,231,635 | 1/1966 | Holden et al. | 260—876 |
| 3,239,478 | 3/1966 | Harlan | 260—880 |

FOREIGN PATENTS

| 903,331 | 8/1962 | Great Britain. |

OTHER REFERENCES

Railsback et al.: "Rubber Age," Jan. 21, 1964, vol. 94, No. 4, pp. 583–589.

DONALD E. CZAJA, Primary Examiner

W. E. PARKER, Assistant Examiner

U.S. Cl. X.R.

260—32.8, 33.2, 33.6, 33.8, 45.8, 45.95, 876, 894

UNITED STATES PATENT OFFICE
CERTIFICATE OF CORRECTION

Patent No. 3,519,585            Dated July 7, 1970

Inventor(s) James A. Miller

It is certified that error appears in the above-identified patent and that said Letters Patent are hereby corrected as shown below:

Column 3, line 14, after "resulting" insert -- in --; line 31, "cannat" should read -- cannot --. Column 4, line 18, after "hexane" insert -- and mixtures of --. Column 5, line 15, "Then" should read -- The --; line 62, "s" should read -- is --; Column 6, line 25, "or" should read -- of --. Column 7, line 40, "anti-oxidnts" should read -- anti-oxidents --; line 46, "restored" should read -- resorted --; line 65, after "distillation" insert -- product --. Column 8, line 37, after "molecule" insert -- and being relatively easy to tackify --; lines 40 and 41, cancel "and being relatively easy to tackify".

Signed and sealed this 3rd day of November 1970.

(SEAL)
Attest:

EDWARD M. FLETCHER, JR.                WILLIAM E. SCHUYLER, JR.
Attesting Officer                      Commissioner of Patents